No. 667,646. Patented Feb. 5, 1901.
L. BERGIER.
LINING METALLIC OR OTHER VESSELS OR TUBES WITH GLASS.
(Application filed Sept. 13, 1898.)
(No Model.) 2 Sheets—Sheet 1.
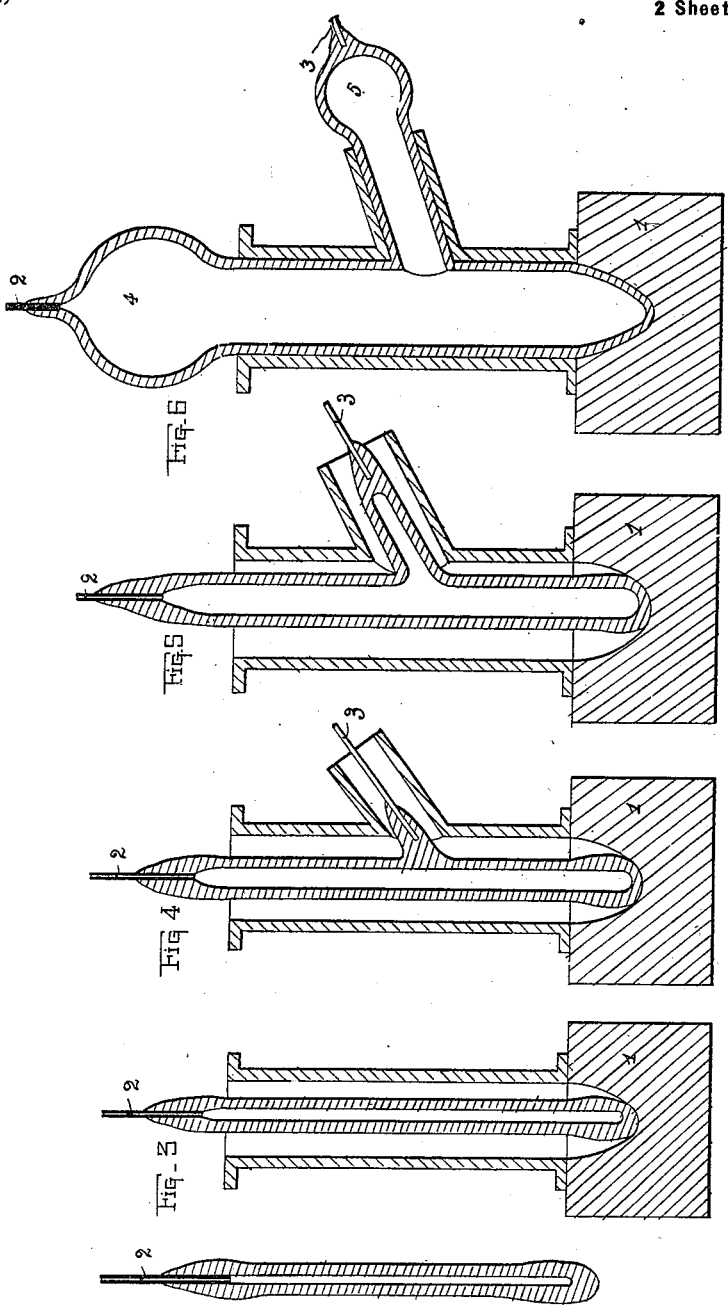

No. 667,646. Patented Feb. 5, 1901.
L. BERGIER.
LINING METALLIC OR OTHER VESSELS OR TUBES WITH GLASS.
(Application filed Sept. 13, 1898.)
(No Model.) 2 Sheets—Sheet 2.
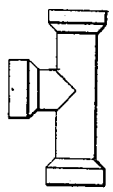
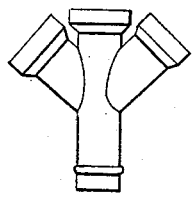
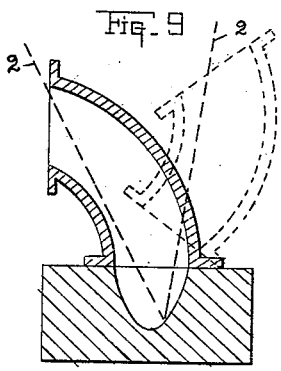
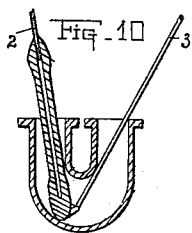
Witnesses:
Inventor
Louis Bergier

UNITED STATES PATENT OFFICE.

LOUIS BERGIER, OF PARIS, FRANCE.

LINING METALLIC OR OTHER VESSELS OR TUBES WITH GLASS.

SPECIFICATION forming part of Letters Patent No. 667,646, dated February 5, 1901.

Application filed September 13, 1898. Serial No. 690,889. (No specimens.)

*To all whom it may concern:*

Be it known that I, LOUIS BERGIER, a citizen of France, residing at Paris, France, have invented certain new and useful Improvements in Lining Metallic or other Vessels or Tubes with Glass, of which the following is a specification.

My present invention has for its object new and useful improvements in processes for lining metallic or other vessels or tubes with glass without any interposition of cement.

In the following specification I will describe my improved process with reference to a metallic tube; but it is obvious that this process may be used for the lining of any other things, such as vessels, milk-pans, wash hand-basins, &c. To my knowledge the process hitherto in use for this purpose is the following: The vessel to be lined with glass is heated to a dull red. Then the gatherer forms a suitable parison—that is to say, he blows out on the end of his pipe a glass muff having nearly the size of the vessel to be lined. Then this parison is introduced with all necessary precautions into the vessel, heated to a dull red, and is blown up to the full size of the inside of the vessel to cause the glass to adhere to it. After this has been done the glass-lined vessel is annealed. However, all the vessels which are lined by the above process are defective. The glass only adheres to a very small extent. Any variation of temperature causes the glass to break off in consequence of the great difference between the coefficient of expansion of the glass and metal or other substances.

After very long researches I discovered the causes rendering the above process unsuitable for practical purposes. First, the glass to be used must have a dilatation comparable with that of the metal. A special glass must be used, the choosing of which is important. Second, the lining operation must be made at the highest possible temperature. Consequently (a) the vessel or tube to be lined must be heated at a white red and not at a dull red, and (b) it must be carefully avoided to work the glass before it is introduced into the vessel. Especially the operation for making a parison—that is to say, the blowing out of a glass muff having nearly the size of the vessel to be lined—is to be dispensed with, for, first, the glass becomes cold during this operation, and, second, the parison is very hard to be introduced into the tube. This introduction is very long, and during this time the glass becomes colder.

By avoiding carefully the above-mentioned perils I am enabled to work practically and very quickly and conveniently glass-lined tubes of any shape—T, Y, U, elbows, &c. My tubes can endure any variation of temperature without deterioration. They can fall down from any height and the glass will not break unless the pipe or vessel itself is broken.

In order that my said invention may be well understood, I will describe the same with reference to the annexed drawings, in which—

Figures 1 and 2 show a blowpipe with a gathering of glass attached thereto, this gathering being of suitable form for the lining. Fig. 3 illustrates the method of glass-lining an open-ended tube. Figs. 4, 5, and 6 illustrate the method of glass-lining a Y-shaped tube. Figs. 7 and 8 show, respectively, a T and a Y with three branches. Fig. 9 illustrates the method of glass-lining an elbow. Fig. 10 illustrates the method of glass-lining a U-shaped tube. Fig. 11 shows a glass-lined vessel.

As hereinabove explained, there is a special glass to be chosen among the well-known glasses. After many tests I have chosen the following for one hundred kilograms of bottle-glass: One hundred kilograms very dry sand, thirty-three kilograms potashes or soda, two kilograms nitrate of potash or soda, fifteen kilograms red lead, five kilograms powdered marble, 0.100 kilogram bichromate, 0.050 kilogram cupric oxid, and 0.050 kilogram metallic antimony.

To line with glass an open-ended tube, Fig. 3, I take this tube and heat it to a white red. After which I place it vertically upon a suitable matrix or holder 1. To each series of tubes of a determined diameter corresponds such a matrix having a truncated opening, the upper diameter of which is equal to that of the tubes. An assistant maintains the tube in its vertical position upon the matrix or holder 1. The gatherer takes in good time on the end of his blowpipe 2 the necessary quantity of hot metal and gives it the form shown in Fig. 1. Then he replaces the glass in the kiln, so that it assumes again its high temperature. At this instant the tube must be on the matrix, ready for the operation. The blower takes quickly his pipe out of the kiln, swings it so as to cause the glass to assume the form shown, Fig. 2, and introduces it quickly axially in the tube, Fig. 3, so that the lower end touches the matrix, the blow-pipe being above the upper end of the tube. All these operations should be executed while both the tube and the glass are at a white red. The gatherer then blows the glass muff up to the full size of the inside of the tube to cause the glass to adhere to its walls. The matrix 1 serves to close the tube at one end to avoid the glass muff becoming longer as it is blown. The operation is finished in less than one minute. The pipe 2 and the matrix 1 are taken away. The glass forming the "burst-off" is removed by grinding or by any other suitable means.

It is obvious that for glass-lining a vessel or a tube with a closed end the operation is the same, but the matrix or holder can be dispensed with.

To line with glass a T-shaped tube, the blower must be assisted by an assistant having a punto or pointel 3—that is to say, an iron rod. The process is the following: The tube conveniently located is placed on the matrix 1 and the blower introduces (as for an open-ended tube) the glass muff, Fig. 2, axially into the vertical branch until the lower end of it reaches the matrix. Then the assistant takes on the end of his punto a good deal of hot metal, introduces it into the other branch, and pulls it against the glass muff, Fig. 4. The blower then blows in his pipe. The muff is distended in the direction of the short branch of the Y, where the assistant takes care to guide his punto in the axis of the said branch, Fig. 5. The continuation of blowing brings the punto out of the tube and causes the glass to fit this tube. When the glass has been blown up to the full size of the tube, what is known in the trade as a "burst-off" 4 5 is formed around the top of each branch, Fig. 6. The operation is ended. The pipe and the punto and also the matrix are taken away and the glass forming the burst-off is ground away. The operation is the same for making a T, Fig. 7, and also for making a Y with three branches, Fig. 8; but in this latter case it is obvious that a second assistant with a punto assists the third branch.

To make an elbow, Fig. 9, this elbow is heated at a white red and is then placed upon the matrix 1 in the position shown in dotted lines, so as to enable the blower to introduce his glass muff pending at his pipe into the elbow and reach the matrix. When that is done, the elbow is put in the position shown in full lines and the blowing is continued as above.

To line with glass a U-shaped tube, Fig. 10, this tube is, while being at a white red, placed vertically, the little branch being at the bottom. The blower introduces the glass muff into one of the branches as far as it it possible. Then an assistant having his punto provided with a little glass relatively cold destined to stick against the lower end of the glass muff meets this muff and draws it through the second branch by aid of his tool. When thus the glass muff has been completely introduced into the tube, the blower blows it up to the full size of the tube until a burst-off is formed at the top of each branch. After this has been done and each tube or vessel has been properly lined with glass it is quickly passed into an annealing-arch and is therein annealed during, say, from twenty to twenty-four hours at a convenient heat to insure the perfect adherence of the glass.

It is obvious that the glass muff, Fig. 2, may be formed by means of machinery on the pressing and blowing process. In the same manner where desirable I use either an air-pump or any other suitable mechanical means of blowing up the glass lining into the vessel or tube.

As it will be understood, my process is characterized by, first, the special composition of glass hereinabove described, and, second, by the very great heat at which the operation should be made, this high degree of heat being obtained by heating the tube or vessel at a white red and by avoiding any parison of the glass. For this purpose the blower shall in a previous operation give the hot metal on the end of this pipe the form illustrated, Fig. 1. Then he shall heat again the glass to put it nearer its fusing-point, and then quickly remove the pipe out of the kiln, swing it a little, and introduce forthwith the resulting glass muff, Fig. 2, axially into the tube heated at a white red.

What I claim is—

1. The herein-described process of glass-lining tubes or vessels without making a parison which consists in heating to a white heat the tube or vessel, then introducing into the same a thick glass muff also at white heat, and then blowing the glass muff to fit the interior of the tube or vessel while both are at a white heat, as set forth.

2. The herein-described method of glass-lining tubes or vessels without making a parison which consists in heating to a white heat the tube or vessel, then introducing into the same a glass muff at a corresponding heat or temperature, drawing out the glass muff through a branch of the tube and then blowing into the glass muff to cause it to fill the tube and branches, as set forth.

3. The herein-described process of glass-lining a tube without making a parison which consists in heating the same to a white heat, placing one end against a resistance to prevent the muff extending beyond the end of the tube, introducing into the tube a glass muff heated to a corresponding heat, blowing into the muff to close one end against said resistance and to cause the glass muff to fill the tube and then annealing, as set forth.

4. The process of lining tubes or vessels with glass, which consists in taking upon a blowpipe the necessary quantity of molten glass and forming thereof a small glass muff, reheating the glass muff to bring it to a white heat and causing it to assume an elongated condition, introducing the same while still at a white heat into the tube or vessel to be lined, also at a white heat, and blowing the glass muff to the full size of the tube or vessel to cause the same to adhere to its walls.

5. The process of lining tubes or vessels with glass, which consists in taking upon a blowpipe the necessary quantity of molten glass and forming thereof a small glass muff, reheating the glass muff to bring it to a white heat and causing it to assume an elongated condition, introducing the same while still at a white heat into the tube or vessel to be lined, also at a white heat, drawing out a portion of the glass muff through a branch of the tube or vessel, and blowing up the glass muff to the full size of the tube or vessel to cause the same to adhere to its walls.

6. The process of lining a tube with glass, which consists in heating a tube to a white heat and placing one end of the same against a resistance, taking upon a blowpipe a quantity of molten glass and forming thereof a small glass muff, reheating the glass muff to bring it to a white heat and causing it to assume an elongated condition, introducing the same while still at a white heat into the previously-heated tube with one end of the muff engaging said resistance, and blowing the glass muff to the full size of the tube to cause the same to adhere to its walls.

In testimony whereof I have hereunto set my hand in presence of two subscribing witnesses.

LOUIS BERGIER.

Witnesses:
 FRANÇOIS COÉNAÉS,
 MAURICE GODDYN.